(12) United States Patent
Koba

(10) Patent No.: US 7,825,961 B2
(45) Date of Patent: Nov. 2, 2010

(54) RECORDING APPARATUS AND METHOD FOR RECORDING IMAGE DATA ON A REMOVABLE RECORDING MEDIUM HAVING PLURAL PARTITIONS

(75) Inventor: Toshinori Koba, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 885 days.

(21) Appl. No.: 11/136,383

(22) Filed: May 25, 2005

(65) Prior Publication Data
US 2005/0265195 A1 Dec. 1, 2005

(30) Foreign Application Priority Data
May 28, 2004 (JP) ............... 2004-159834

(51) Int. Cl.
*H04N 5/76* (2006.01)
*H04N 5/225* (2006.01)

(52) U.S. Cl. .................. 348/231.2; 348/374

(58) Field of Classification Search .......... 348/231.2, 348/374
See application file for complete search history.

(56) References Cited

U.S. PATENT DOCUMENTS

| | | | | |
|---|---|---|---|---|
| 5,237,460 | A | 8/1993 | Miller et al. | 360/8 |
| 5,461,719 | A | 10/1995 | Hosoya | 395/439 |
| 5,986,700 | A * | 11/1999 | Wakui | 348/231.8 |
| 6,988,174 | B1* | 1/2006 | Yamashita | 711/153 |
| 7,352,955 | B2* | 4/2008 | Kotani | 386/52 |
| 2003/0023826 | A1* | 1/2003 | McMichael et al. | 711/173 |
| 2003/0107654 | A1 | 6/2003 | Ohmura | 348/207.99 |
| 2003/0184650 | A1* | 10/2003 | Brown et al. | 348/207.1 |
| 2005/0036034 | A1* | 2/2005 | Rea et al. | 348/207.1 |
| 2005/0187897 | A1* | 8/2005 | Pawar et al. | 707/1 |
| 2005/0259163 | A1* | 11/2005 | Tsujii et al. | 348/231.2 |
| 2007/0244941 | A1* | 10/2007 | Reed et al. | 707/205 |

FOREIGN PATENT DOCUMENTS

| | | |
|---|---|---|
| EP | 0 524 809 A2 | 1/1993 |
| JP | 8-153376 | 6/1996 |
| JP | 10-21123 | 1/1998 |
| JP | 2000-267818 | 9/2000 |
| JP | 2000-350138 | 12/2000 |
| JP | 2001-110169 | 4/2001 |
| JP | 2003-179857 | 6/2003 |
| JP | 2003-186727 | 7/2003 |
| WO | WO 2000/55719 | 9/2000 |

* cited by examiner

OTHER PUBLICATIONS

Exhibits 1-5 (Microsoft Windows Explorer—Copyright 1981-2001).*

*Primary Examiner*—Sinh Tran
*Assistant Examiner*—Hung H Lam
(74) *Attorney, Agent, or Firm*—Fitzpatrick, Cella, Harper & Scinto (57) ABSTRACT

Disclosed is a recording apparatus capable of recording image data on a removable recording medium having a plurality of partitions. The apparatus includes a partition recognition unit (1001) for recognizing partitions of a loaded recording medium; a recording/playback unit (105) for selectively recording on any partition of the recording medium; a association storage unit (1003) for storing association information indicating association between a recording setting and a recording-destination partition; and a system controller (106) for specifying a data recording-destination partition based upon the association information and adopting this partition as a recording-destination partition. As a result, in a recording apparatus for recording on a removable recording medium, it is possible to readily set a recording destination in a case where a plurality of partitions exist on a single recording medium.

4 Claims, 7 Drawing Sheets

RECORDING APPARATUS AND METHOD FOR RECORDING IMAGE DATA ON A REMOVABLE RECORDING MEDIUM HAVING PLURAL PARTITIONS

FIELD OF THE INVENTION

This invention relates to a recording apparatus and method for recording on a removable recording medium.

BACKGROUND OF THE INVENTION

In a conventional apparatus such as a digital camera for recording images and audio on a removable recording medium, the general practice is to use a single recording medium in a single logical format (file system). In other words, a single recording medium is handled as a single partition.

Figure 5:
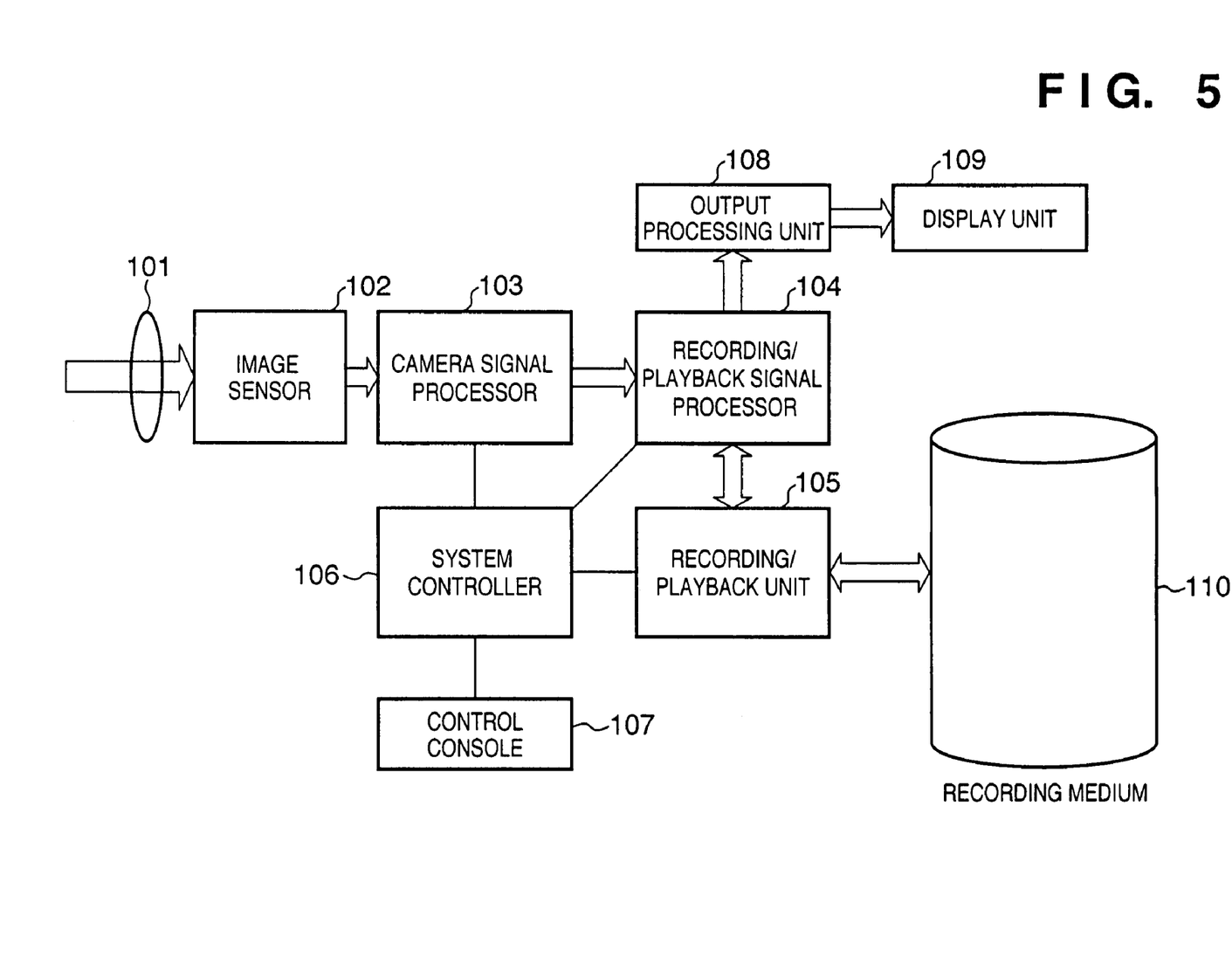
FIG. 5 is a block diagram for describing the structure of a typical recording apparatus according to the prior art.

FIG. 5 is a block diagram illustrating an example of the structure of a digital camera serving as such a recording apparatus according to the prior art. As shown in FIG. 5, entrant light from an optical system 101 such as a lens is converted to an electrical signal by an image sensor 102. A camera signal processor 103 applies processing such as a digital conversion and white balance adjustment to the electrical signal that is output from the image sensor 102. At the time of recording, a recording/playback signal processor 104 converts the signal received from the camera signal processor 103 to data for recording on a recording medium 110. The recording medium 110 is a removable read/write recording medium (e.g., an IC card) in which the entirety of the medium has been logically formatted as one volume. At the time of recording, a recording/playback unit 105 writes data from the recording/playback signal processor 104 to the recording medium 110. A system controller 106, which has, e.g., a CPU, RAM and ROM. Management of the status of each unit in the apparatus and control of executed processing are performed by having the CPU of the system controller execute a program, which has been recorded in the ROM, while utilizing the RAM. A control console 107 comprises buttons and switches on the main body of the apparatus, or a remote controller, whereby a processing execute/halt command such as for starting and ending photography and various settings are input to the apparatus by the user.

An output processing unit 108 receives a signal for output from the recording/playback signal processor 104 and outputs display data or data conforming to various interfaces. A display unit 109 such as a viewfinder or liquid crystal panel displays a signal for output (confirmation of a recorded image, a setting menu, etc.) from the recording/playback signal processor 104.

At the time of playback, an operation that is the reverse of that at the time of recording is executed. In other words, the recording/playback unit 105 reads out data that has been recorded on the recording medium 110, the recording/playback signal processor 104 subjects this data to a signal conversion for output and outputs the resultant signal to the output processing unit 108.

Though there is no particular illustration regarding audio, an analog voice signal acquired using a microphone is digitized by the camera signal processor 103, noise removal and filter processing are applied as necessary by the recording/playback signal processor 104, and then the resultant signal is written to a recording medium by the recording/playback unit 105. Further, at the time of playback, the recording/playback unit 105 reads out data that has been recorded on the recording medium 110, the recording/playback signal processor 104 applies signal processing to obtain a signal for output, and the signal is delivered to the output processing unit 108. The signal is amplified by the output processing unit 108 and output from a speaker, which is not shown.

A recording apparatus that is capable of utilizing a plurality of recording media has also been proposed. For example, the specification of Japanese Patent Application Laid-Open No. 08-153376 proposes an arrangement having at least first and second recording media (an IC memory card and a hard disk card) of different data recording formats, in which the hard disk card can be used only when the apparatus is driven by an AC power supply. Further, the specification of Japanese Patent Application Laid-Open No. 2000-267818 (WO00/55719) proposes a method of implementing a plurality of partitions by an exchangeable recording medium.

Conventionally, the storage capacity of a removable recording medium is comparatively small and the medium is considered to be unsuitable for storing a large quantity of data. However, increasing the capacity of a removable recording medium would enable the recording of a large amount of data and therefore methods of utilizing such recording medium are now being reexamined.

Furthermore, increasing the capacity of a removable recording medium means that the capacity capable of being handled by the conventional logical format (file system) will be exceeded, and novel logical formats that are not compatible with the conventional-type logical format are now being utilized. In view of these circumstances, in order to maintain compatibility with conventional-type logical formats and for the sake of data classification, it is predicted that areas that have been logically formatted differently from one another will be mixed in the same recording medium and that a recording area will be used upon being divided into a plurality of partitions. In fact, in personal computers, an increase in the capacity of hard disks (although these are not removable storage media) has been accompanied by the dividing of the storage area of the hard disk into a plurality of partitions and the selective usage of the partitions depending upon the application.

However, the selection of a recording destination in a case where a plurality of partitions exist on a single recording medium has not been considered in a conventional recording apparatus that uses a removable recording medium.

SUMMARY OF THE INVENTION

Accordingly, a prime object of the present invention, which deals with a case where a plurality of partitions exist in a recording medium, is to automatically select a recording-destination partition by a setting to thereby reduce the labor involved in a user operation for selecting a partition and diminish selection errors.

The foregoing object is attained by providing a recording apparatus capable of recording image data on a removable recording medium having a plurality of partitions, comprising: recognition means for recognizing partitions of a loaded recording medium; recording means capable of selectively recording on any partition of the recording medium; storage means for storing association information indicating association between an image-data recording setting and a recording-destination partition setting; and selection means for specifying an image-data recording-destination partition based upon the association information and adopting this partition as a recording-destination partition in which recording is performed by the recording means.

The foregoing object is also attained by providing a recording method for recording image data on a removable recording medium having a plurality of partitions, comprising: recognizing partitions of a loaded recording medium; specifying an image-data recording destination partition by referring to storage means in which has been stored association information indicating association between an image-data recording setting and a recording-destination partition setting; and recording image data in the recording-destination partition specified.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
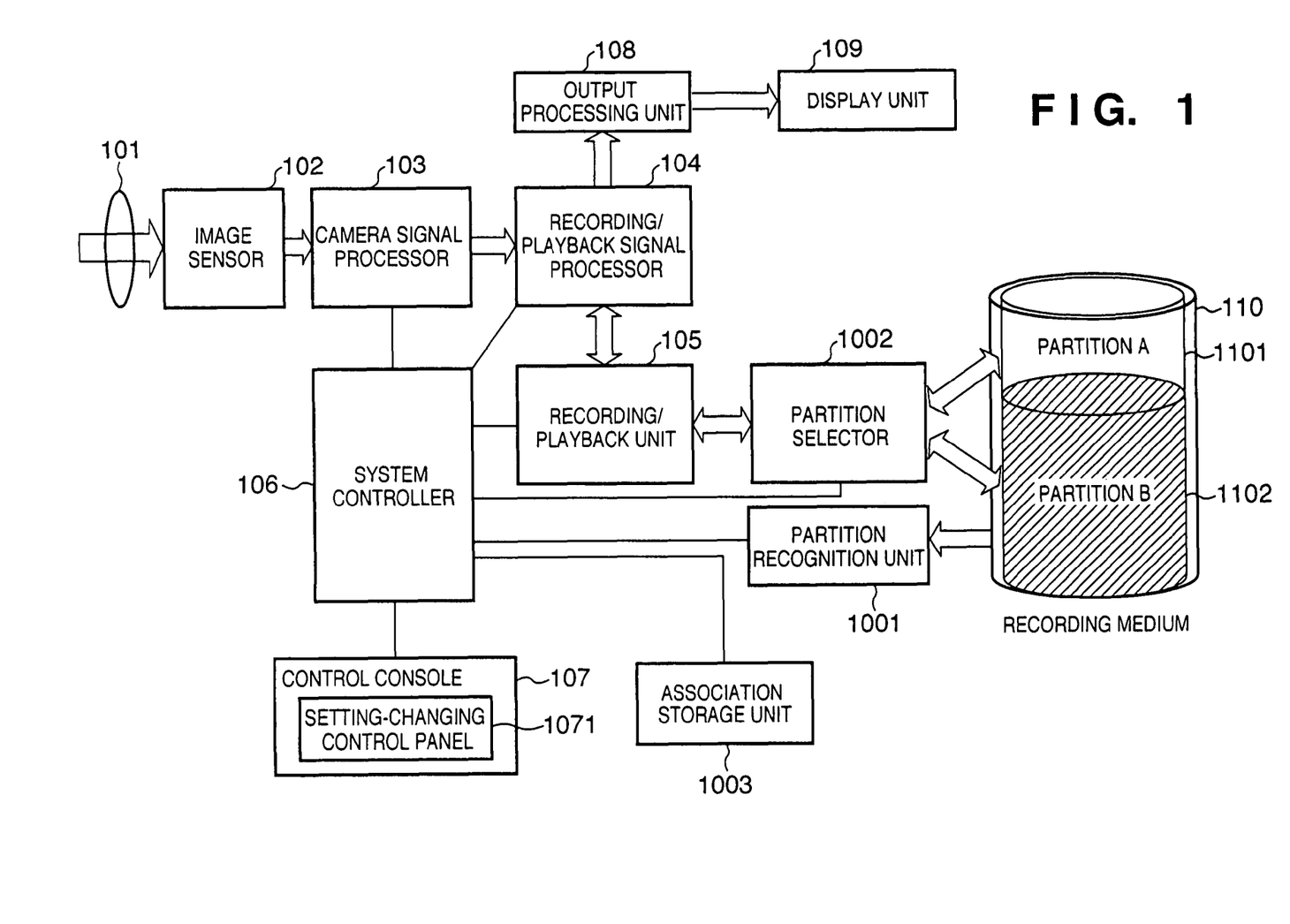
FIG. 1 is a block diagram illustrating an example of the structure of a recording apparatus according to an embodiment of the present invention.

FIG. 1 is a block diagram illustrating an example of the structure of a recording apparatus according to an embodiment of the present invention, in which components identical with those of the apparatus shown in FIG. 5 are designated by like reference characters and need not be described again. As shown in FIG. 1, a partition recognition unit 1001 recognizes valid partitions in a removable recording medium 110. A partition selector 1002 selects a recording-destination partition (namely a partition in which data is to be recorded) from the valid partitions that have been recognized by the partition recognition unit 1001. An association storage unit 1003 stores association settings between set values of recording setting items, such as recording format and size, and partitions utilized preferentially in recording. A setting-changing control panel 1071 included in the control console 107 comprises buttons and keys by which the user specifies a setting menu display on the display unit 109 and changes, switches over or selects a recording setting utilizing the association storage unit 1003. For the sake of simplicity, the removable recording medium 110 has been divided into two partitions, namely a partition A (1101) and a partition B (1102). Of course, the recording medium may be partitioned into three of more partitions.

Figure 2:
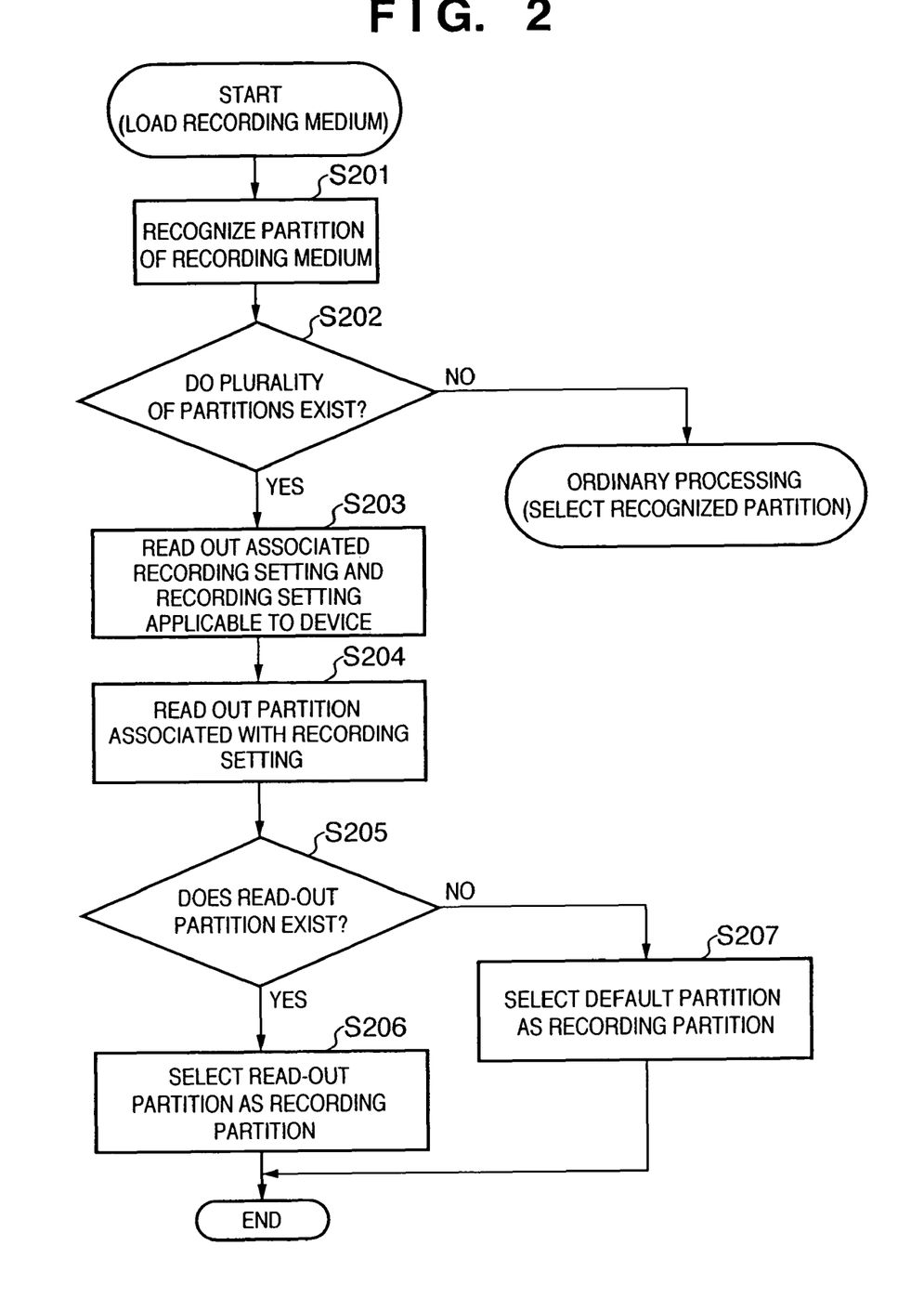
FIG. 2 is a flowchart illustrating processing at the time of recognition of a recording medium according to a first embodiment of the present invention.
Figure 3:
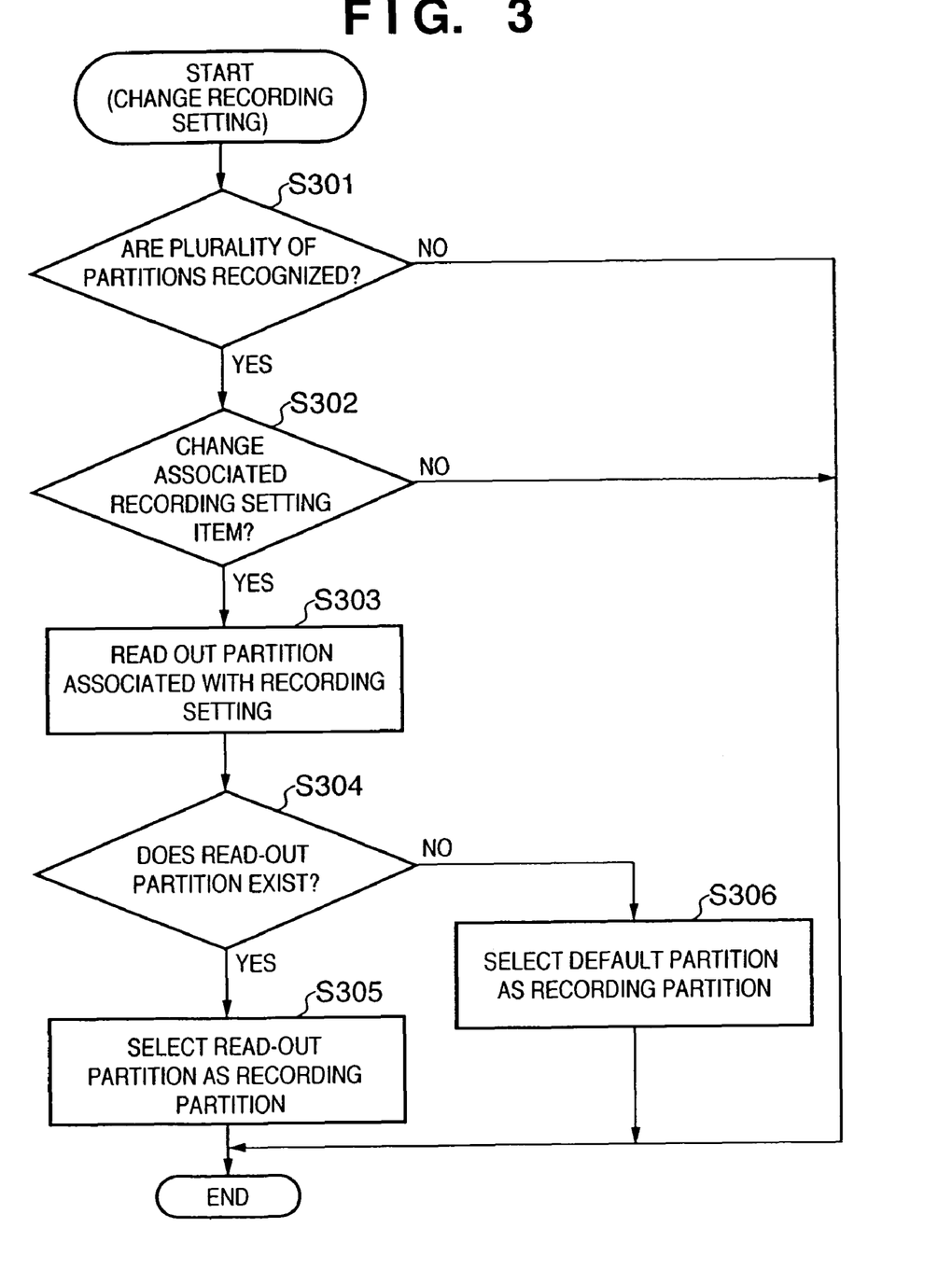
FIG. 3 is a flowchart illustrating processing at the time of a change in a recording setting according to the first embodiment.

FIGS. 2 and 3 are flowcharts for describing the operation of the recording apparatus according to this embodiment. FIG. 2 illustrates an operation executed in a case where the power supply of the apparatus has been turned on or loading of the recording medium has been recognized. The various processing operations described below are implemented by control performed by the system controller 106 that executes a control program recorded in the ROM (not shown), as described above.

At step S201 in FIG. 2, the partition recognition unit 1001 investigates the loaded recording medium to determine whether it contains a valid partition that the recording apparatus can recognize and notifies the system controller 106 of the result. Next, at step S202, the system controller 106 determines whether a plurality of valid partitions recognized at step S201 exist. Control proceeds to step S203 if a plurality of partitions have been recognized. If a plurality of partitions have not been recognized, processing similar to that of the prior art is executed. In other words, a setting is performed using the single recognized valid partition as the destination selected by the partition selector 1002. If a recognizable valid partition does not exist, a recording error decision is rendered and prescribed error processing is executed.

Figure 4:
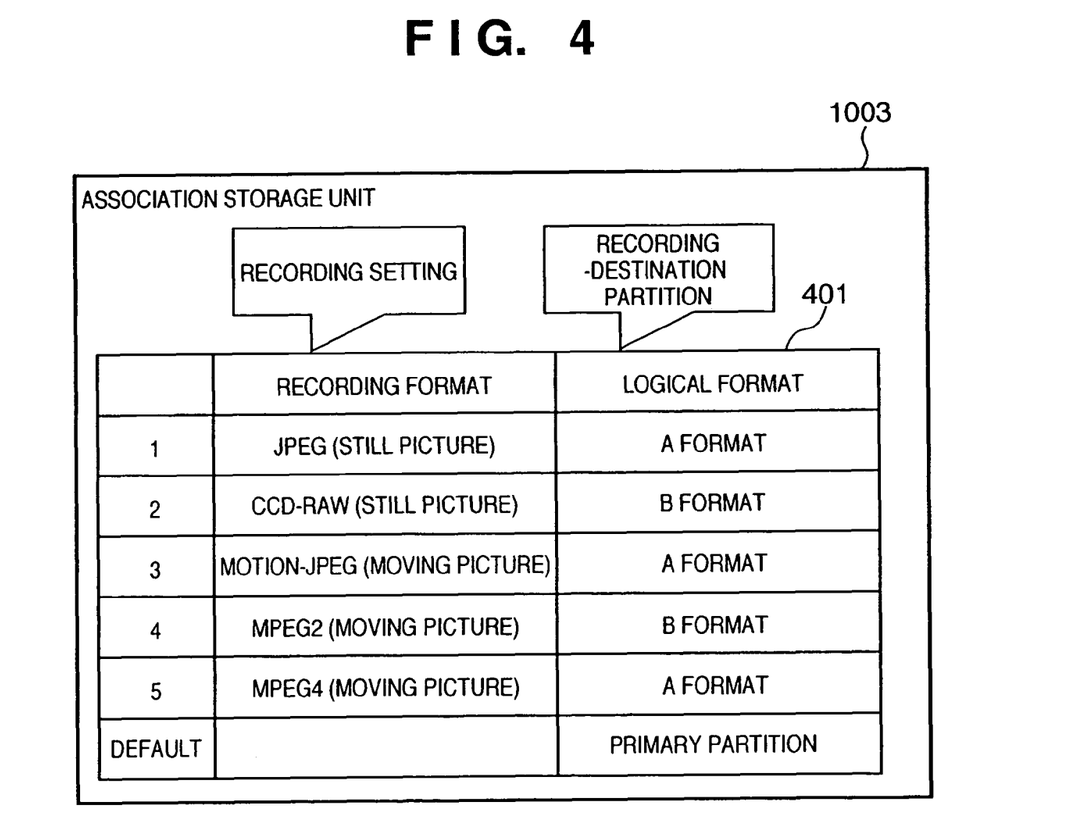
FIG. 4 is a diagram illustrating an example of an association list in an association storage unit in the first embodiment.

FIG. 4 illustrates an example of association settings stored by the association storage unit 1003. Here, using recording formats as recording setting items and using logical formats (file systems) as information representing partitions utilized preferentially in recording, preferential-recording logical formats are associated with respective ones of the recording formats. The recording formats in this embodiment signify the recording of images that have been compressed by various compression formats, such as a JPEG-compressed image, a CCD-RAW compressed image, a motion-JPEG-compressed image, an MPEG2-compressed image and an MPEG4-compressed image.

At step S203, the fact that a recording setting item that has been stored by the association storage unit 1003, which is implemented as one area of, e.g., a non-volatile RAM (not shown), is a recording format is read out, and the recording format that has been set in the apparatus is read out. Next, at step S204, the partition item (here the logical format) that is applicable to the recording setting (here the recording format) of the apparatus is read out of an association list 401. Then, at step S205, it is determined whether the partition that has been read out at step S204 exists in the recording medium 110. Control proceeds to step S206 if the partition exists and to step S207 if it does not exist.

The relevant partition read out at step S204 is selected by the partition selector 1002 at step S206. On the other hand, at step S207, a default partition (here a primary partition), for a case where a relevant partition does not exist, registered in the association list 401 is selected by the partition selector 1002, or the user is alerted to the fact that a usable partition does not exist and is prompted to change the setting again.

Next, reference will be had to the flowchart of FIG. 3 to describe processing in case where a recording setting has been changed in a state in which a recording medium has been loaded.

First, at step S301, based upon the results of step S202 (FIG. 2) executed when a recording medium has been loaded, it is determined whether a plurality of partitions have already been recognized. Control proceeds to step S302 if a plurality of partitions have already been recognized. If a plurality of partitions have not been recognized, processing is exited.

It is determined at step S302 whether a recording setting that has been changed by the user is a recording setting item (here a recording format) that has been stored in the association storage unit 1003. If the applicable setting change has been made, control proceeds to step S303; otherwise, processing is exited. At step S303, the partition item (here the logical format) that is applicable to the recording setting (here the recording format) of the apparatus is read out of the association list 401. Then, at step S304, it is determined whether the partition that has been read out at step S303 exists in the recording medium 110. Control proceeds to step S305 if the partition exists and to step S306 if it does not exist.

The partition read out at step S303 is selected by the partition selector 1002 at step S305. At step S306, a default partition (here a primary partition), for a case where a relevant partition does not exist, registered in the association list 401 is selected by the partition selector 1002, or the user is alerted to the fact that a usable partition does not exist and is prompted to change the setting again.

It should be noted that in a case where the apparatus has a function (a logical format function) that provides a plurality of partitions in a recording medium, and a configuration change that forms a plurality of partitions in a recording medium having a signal partition has been carried out, it is also possible to deal with a configuration change after loading of the recording medium by executing processing similar to that executed at the time of loading described in connection with FIG. 2.

Further, respective ones of recording formats and logical formats are used as associated items of recording settings and recording partitions. However, it is also possible to use any image-recording parameters as recording settings, examples of which are recorded-image size (number of pixels), compression rate (image quality), camera shooting setting and mode and profile level used in the MPEG-2 standard, etc. It is also possible to use partition attributes and partition size, etc., as the items of recording partitions associated. In other words, by associating the values of any parameters at the time of recording and parameters that are capable of specifying recording-destination partitions, it is possible to specify a recording-destination partition of data that satisfies the value of any parameter at the time of recording.

Furthermore, although the selection of a recording-destination partition is performed when a recording medium is recognized and when a setting is changed, it is also possible to select a recording-destination partition immediately before recording on a recording medium by executing processing similar to that of FIG. 2 when recording is executed.

It should be noted that although there is one association list in this embodiment, it is also possible to perform the selection of a recording-destination partition using a plurality of association lists by providing an order of priority. For example, it can be so arranged that if a partition that has been associated with a certain recording setting item does not exist, a recording-destination partition is selected using a list that associates another recording setting item and a recording-destination partition.

Thus, in accordance with the first embodiment, as described above, in a recording apparatus that is capable of utilizing a removable recording medium having a plurality of recording partitions, the plurality of recording partitions and recording setting items are associated in advance and a recording-destination partition is selected automatically based upon the association. As a result, not only is it possible to utilize the recording medium in accordance with the volition of the user but it is also possible to reduce the labor involved in setting a recording-destination partition and to prevent setting errors at the same time.

Second Embodiment

A recording apparatus according to a second embodiment of the present invention will now be described.

The recording apparatus according to this embodiment has a function for changing the association list 401 stored by the association storage unit 1003 shown in FIG. 1. In other words, the system controller 106 operates as means for changing an association.

The system controller 106 in this embodiment causes the display unit 109 to display a user interface that is for changing the association list 401 of the association storage unit 1003 and changes the content of the association list 401 in accordance with an input from the setting-changing control panel 1071 included in the control console 107.

Figure 6:
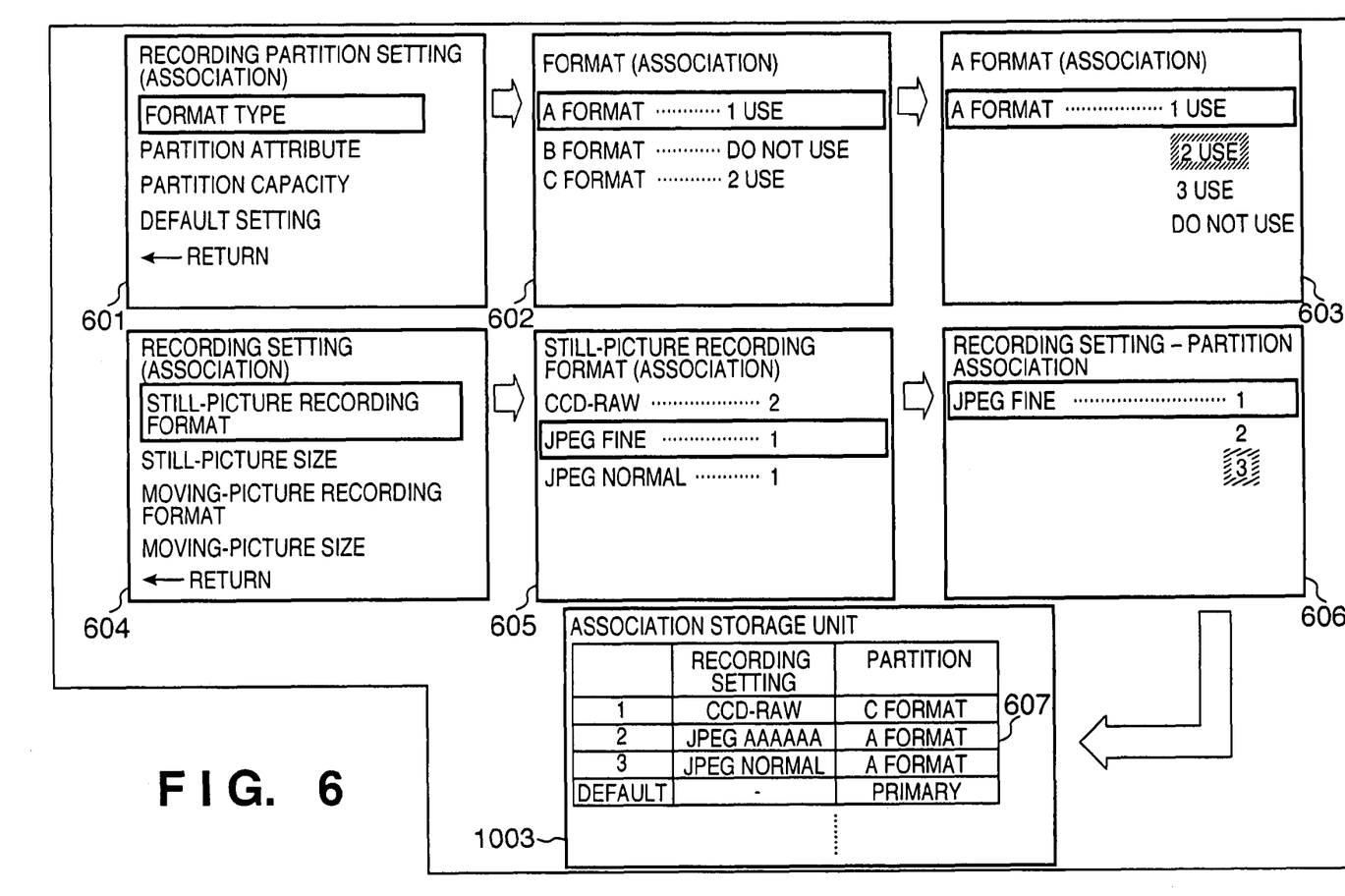
FIG. 6 is a diagram useful in describing the course of processing for changing an association setting in the second embodiment.

FIG. 6 is a diagram useful in describing an example of the user interface that the system controller 106 presents on the display unit 109, as well as change processing using this user interface, according to this embodiment. In this embodiment, as shown in FIG. 6, use is made of a graphical user interface that employs a hierarchical menu commonly utilized in electronic devices such as digital still cameras and digital video cameras. The user operates arrow keys and an execute key (inclusive of other keys and buttons that function equivalently) included on the setting-changing control panel 1071 and selects desired menu items to apply commands, whereby the system controller 106 operates in accordance with these commands to execute processing to change a setting.

Figure 7:
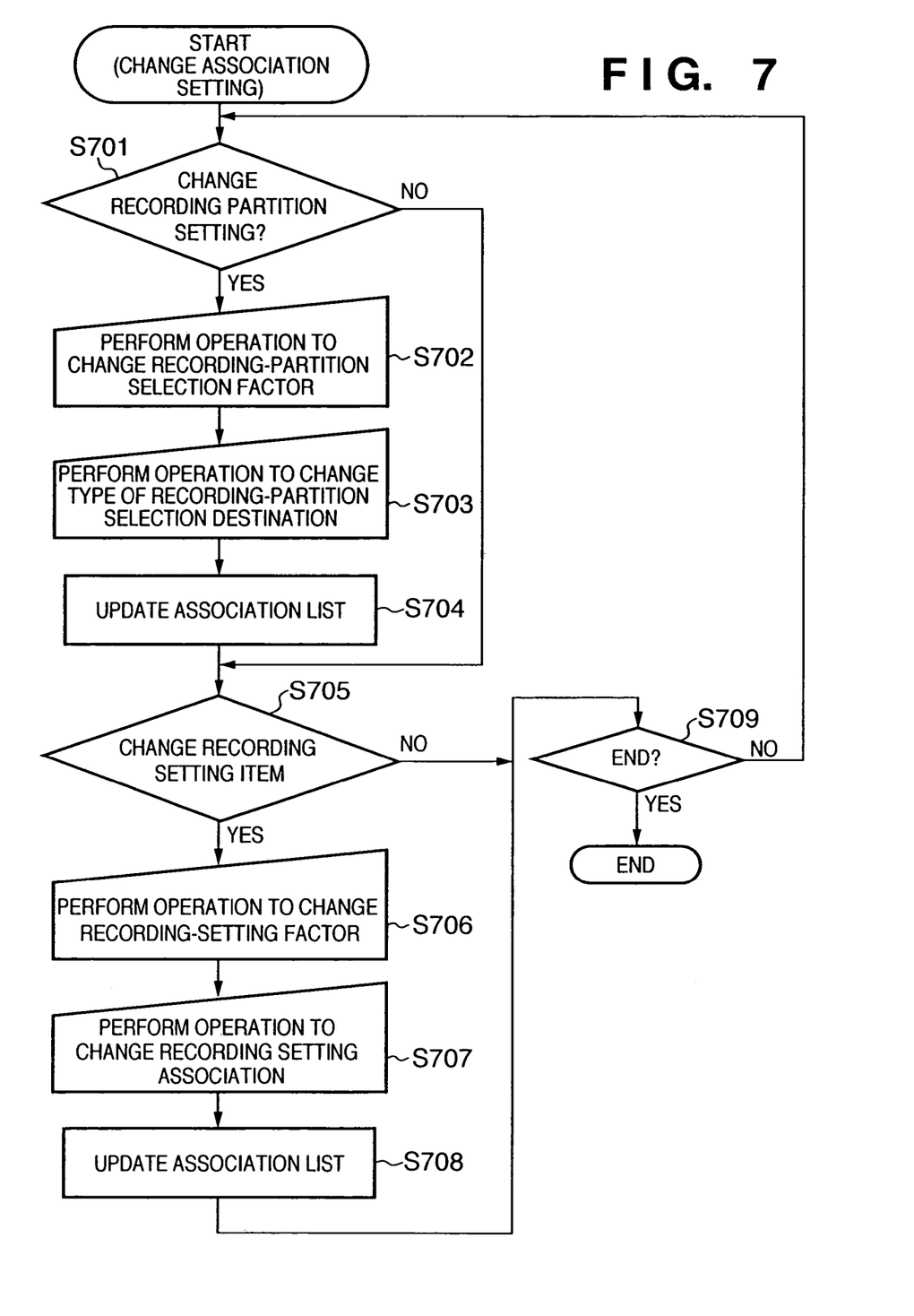
FIG. 7 is a flowchart illustrating processing for changing an association setting in the second embodiment.

FIG. 7 is a flowchart for describing processing to change a setting in the recording apparatus of this embodiment. This processing will be described with reference to FIGS. 6 and 7. The processing shown in FIG. 7 is executed in a case where, e.g., a change in an association list has been specified through the control console 107.

First, if a command to change a recording partition item has been detected at step S701, control proceeds to step S702; otherwise, control proceeds to step S705. At step S702, the system controller sets an item that is to be a factor when the partition selector 1002 of FIG. 1 selects a recording partition.

A recording-partition setting screen (601 in FIG. 6) is displayed at step S702. As mentioned earlier, it is possible to utilize a partition attribute or volume in addition to a logical format as a recording-partition setting item. The setting screen 601 allows the user to select what association to make (change) between an item among settable items and a partition as a recording-destination selection factor.

It will be assumed here that a change in the association between a logical format and a partition has been specified, as illustrated at 601 in FIG. 6. In response to the command, the system controller 106 causes a sub-menu 602 to be displayed.

At step S703, the details of the factor set (selected) at step S702 and the used-attribute of the present selection-destination partition are displayed on the setting screen 602. Since a logical format has been designated on the setting screen 601, this recording apparatus indicates an association between a list of logical formats that are capable of being recognized, recorded and reproduced, and individual logical formats.

More specifically, in the example of setting screen 602, the loaded recording medium has three partitions. An A format and a C format have been associated with first and second partitions, respectively, and no partition has been associated with a B format.

From the setting screen 602, the user selects and specifies the logical format for which an association is desired. In response to the command made, the system controller 106 displays a setting screen 603 corresponding to the logical format selected.

In this embodiment, in order to prevent different logical formats from being set with respect to the same partition (i.e., in order to prevent overlapping registration), a gray-out is displayed with regard to a partition that has already been selected (i.e., a partition that is not selectable), thereby visually expressing the fact that this setting cannot be made. (The second partition that has already been associated with the C format is displayed as a gray-out on the setting screen 603). Of course, it is also possible to present a warning display when a non-selectable partition has been selected.

Using the setting screen 603, the user selects and specifies a partition desired to be associated with the logical format selected at step S702, or selects non-association (i.e., selects not to use this logical format).

In response to this command, the system controller 106 updates the recording partition item in the association list (step S704).

A recording setting screen (604 in FIG. 6) is displayed at step S705. It is also possible to utilize a still-picture recording format, a still-picture size, a moving-picture recording format and a moving-picture size as a recording setting item, as mentioned above. The setting screen 604 allows the user to select what association to make (change) between an item among settable items and a partition.

It will be assumed here that a change in the association between a still-picture recording format and a partition has been specified, as illustrated at 604 in FIG. 6. In response to the command, the system controller 106 causes a sub-menu 605 to be displayed.

At step S706, the details of the item set (selected) at step S705 and the used-attribute of the present selection-destination partition are displayed on the setting screen 605. Since the still-picture recording format has been designated on the setting screen 604, this recording apparatus indicates an association between a list of still-picture recording formats that are capable of being recognized, recorded and reproduced, and individual recording formats.

More specifically, in the example of setting screen 605, a second partition has been associated with a CCD-RAW recording format, and a first partition has been associated with associated with JPEG fine and JPEG normal.

From the setting screen 605, the user selects and specifies the recording format for which an association is desired. In response to the command made, the system controller 106 displays a setting screen 606 corresponding to the recording format selected.

In this embodiment, in order to prevent an association of recording setting to be set with respect to a partition that is not used, a gray-out is displayed with regard to a partition that is not selectable, thereby visually expressing the fact that this setting cannot be made. (The third partition, which is unusable, is displayed as a gray-out on the setting screen 606). Of course, it is also possible to present a warning display when a non-selectable partition has been selected.

Using the setting screen 606, the user selects and specifies a partition desired to be associated with the recording format selected at step S706.

In response to this command, the system controller 106 updates the recording partition item in the association list (step S704).

In a case where an end command (not shown) has been entered from any setting screen, processing is exited (step S709). If the end command is not issued, then control returns to step S701. Of course, it may be so arranged that processing is exited automatically when updating of a list ends.

By virtue of the processing above, an association list 607 is set in the association storage unit 1003 and is utilized at the time of recording.

Thus, in accordance with the first embodiment, as described above, it is possible for a user to associate a recording setting and a recording partition. As a result, by making an association setting for maintaining compatibility or making an association setting for data classification conforming to a recording setting, it is possible to select a recording-destination partition that conforms to the preferences of the user.

Other Embodiments

Although the foregoing embodiments have been described only with regard to a recording apparatus comprising a single device, equivalent functions may also be implemented by a system comprising a plurality of devices.

Further, a FAT (File Allocation System) 16, FAT 32 and HFS (Hierarchical File System), etc., are conceivable as the above-mentioned logical formats, although the present invention is not limited to these systems.

It should be noted that the present invention also covers a case where software programs for implementing the functions of the above embodiments are supplied directly from a recording medium, or through use of wired/wireless communication, to a system or apparatus having a computer that is capable of executing the above-mentioned programs, and the system or apparatus executes the supplied programs to thereby implement the equivalent functions.

Accordingly, program code per se supplied to and installed in a computer in order that the computer may execute the processing of the present invention also implements the invention. In other words, the computer program that implements the processing of the present invention also is covered by the present invention.

In this case, so long as the system or apparatus has the functions of the program, the form of the program, e.g., object code, a program executed by an interpreter or script data supplied to an operating system, etc., does not matter.

Examples of recording media by which the program can be supplied are magnetic recording media such as floppy disk, hard disk and magnetic tape, optical/magneto-optical storage media such as a magneto-optical disk, CD-ROM, CD-R, CD-RW, DVD-ROM, DVD-R and DVD-RW, and a non-volatile semiconductor memory.

As for the method of supplying the program using wired/wireless communication, the computer program itself for forming the present invention in the server of a computer network, or a data file (program-data file) that can serve as a computer program for forming the present invention in a client computer, such as a compressed file having an automatic install function, can be stored and the program-data file can be downloaded to a connected client computer. In such case the program-data file can be divided into a plurality of segment files and the segment files can be deployed at different servers.

In other words, the present invention also covers a server apparatus that allows multiple users to download a program-data file for the purpose of implementing the functions of the present invention by computer.

Further, it is also possible to encrypt and store the program of the present invention on a storage medium such as a CD-ROM, distribute the storage medium to users, allow users who meet certain requirements to download decryption key information from, e.g., a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer can perform all or a part of the actual processing based upon commands in the program so that the functions of the foregoing embodiments are be implemented by this processing.

Furthermore, after the program read from a recording medium is written to a function expansion board inserted into the computer or to a memory provided in a function expansion unit connected to the computer, a CPU or the like mounted on the function expansion board or function expansion unit can perform all or a part of the actual processing based upon commands in the program so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-159834 filed on May 28, 2004, which is hereby incorporated by reference herein.

What is claimed is:

1. A digital camera capable of recording image data on a recording medium having a plurality of partitions, comprising:
    an image sensing unit that senses a subject and obtains image data of the subject;
    a recognition unit that recognizes partitions of a loaded recording medium;
    a recording unit that is capable of selectively recording on any partition of the loaded recording medium;
    a storage unit that stores association information indicating an association between an image-data recording format and a recording-destination partition setting, wherein the image-data recording format is a recording format of image data to be obtained by said image sensing unit, wherein the recording-destination partition setting includes a logical format of a recording-destination partition to which the image data is to be recorded by said recording unit, and wherein one of the plurality of partitions is capable of recording a plurality of image of data having image data recording formats that are not recorded by the other of the plurality of partitions;
    an operating unit that allows a user to apply a command to said recording apparatus;
    an image-data recording format changing unit that changes, responsive to a command from said operating unit, the image data recording format; and
    a selection unit that automatically specifies a partition of the loaded recording medium and adopts the specified partition as the recording-destination partition, wherein the partition as the recording-destination partition is specified based upon the image-data recording format changed by said image-data recording format changing unit and the association information.

2. The a digital camera according to claim 1, wherein said selection unit specifies the partition of the recording destination when a recording medium is installed anew.

3. The a digital camera according to claim 1, wherein said selection unit specifies the partition of the recording destination when the image data is recorded.

4. A recording method of a digital camera for recording image data on a recording medium having a plurality of partitions, comprising:
    sensing a subject and obtaining image data of the subject with an image sensing unit;
    recognizing partitions of a loaded recording medium;
    storing association information indicating an association between an image-data recording format and a recording-destination partition setting, wherein the image-data recording format is a recording format of image data to be obtained by said image sensing step, wherein the recording-destination partition setting includes a logical format of a recording-destination partition to which the image data is to be recorded, and
    and wherein one of the plurality of partitions is capable of recording a plurality of image data having image data recording formats that are not recorded by the other of the plurality of partitions;
    determining whether the image-data recording format stored association is changed by a user's operation;
    automatically specifying an image-data recording destination partition of the loaded recording medium based on the image-data recording format changed by the user's operation and the association information when it is determined that the image-data recording format association information is changed by the user's operation; and
    recording the image data in the specified image-data as the recording-destination partition.

* * * * *